April 28, 1942.  E. M. WELCH  2,280,989
PHOTOGRAPHIC CAMERA AND PROJECTOR
Filed June 27, 1940  6 Sheets-Sheet 1
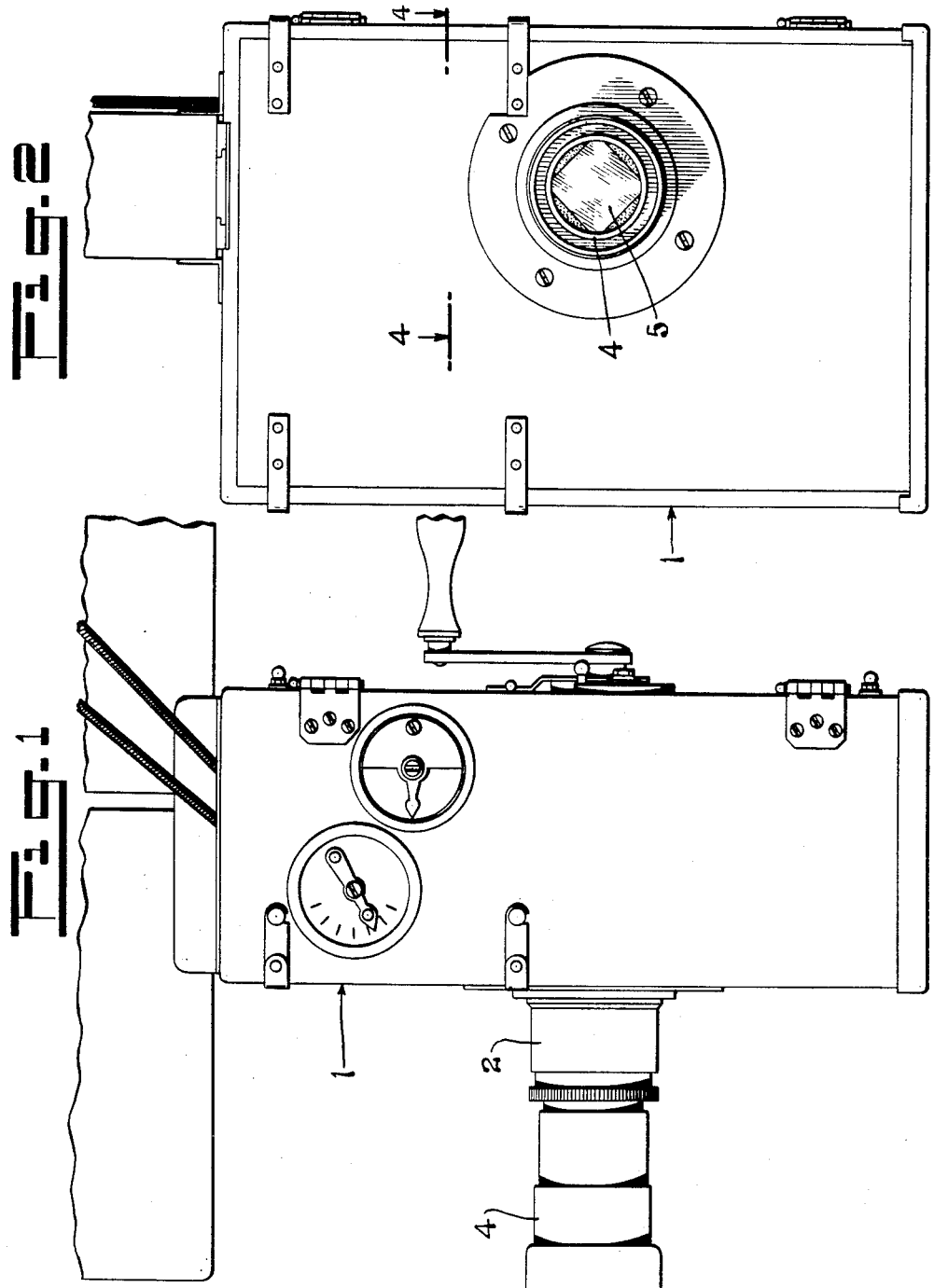
INVENTOR.
Earl M. Welch
BY William Pelzer
Attorney April 28, 1942.                    E. M. WELCH                    2,280,989
                        PHOTOGRAPHIC CAMERA AND PROJECTOR
                           Filed June 27, 1940            6 Sheets-Sheet 2
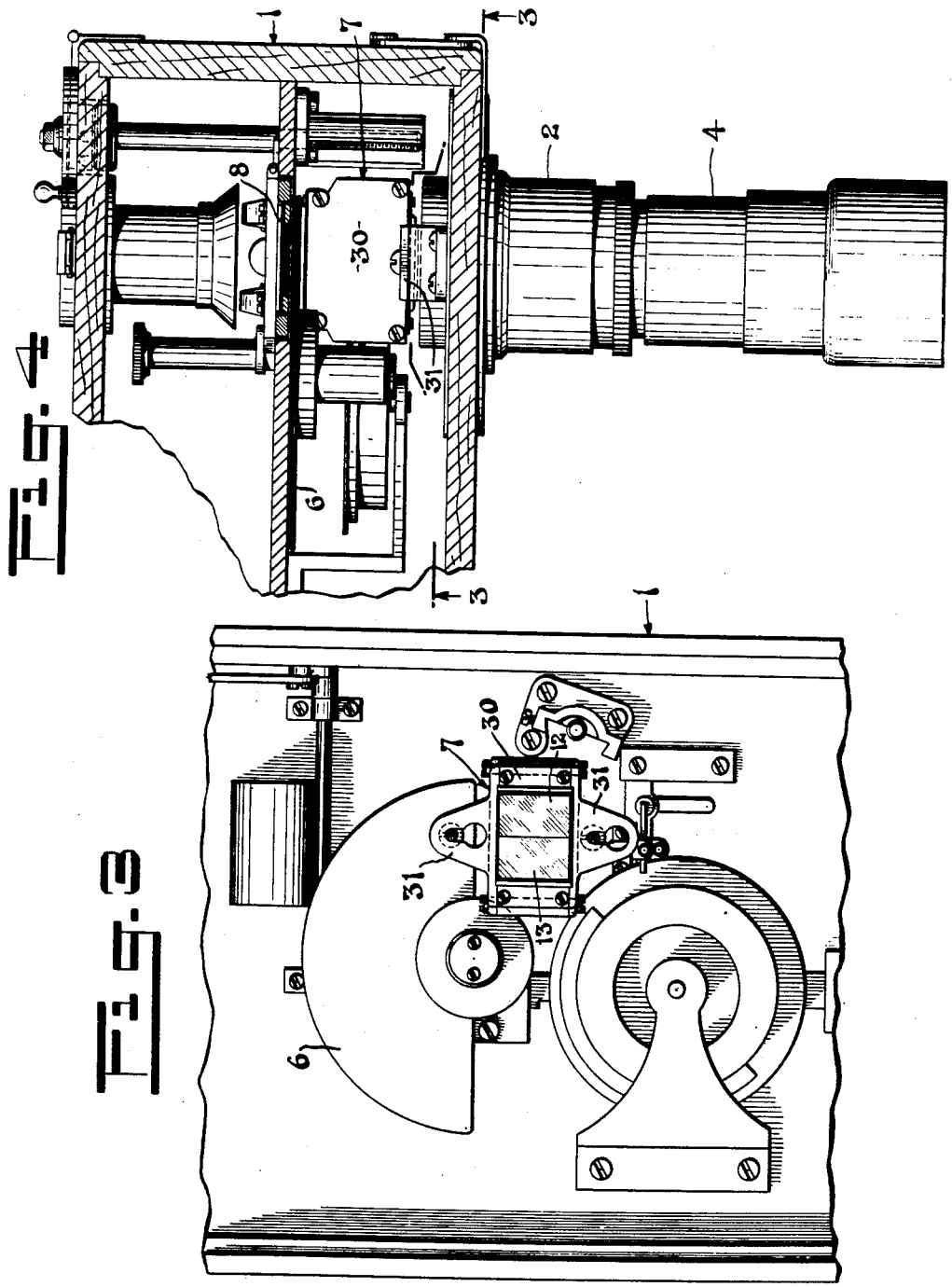
INVENTOR.
Earl M. Welch
BY William Pelzer
    Attorney April 28, 1942. E. M. WELCH 2,280,989
PHOTOGRAPHIC CAMERA AND PROJECTOR
Filed June 27, 1940 6 Sheets-Sheet 3
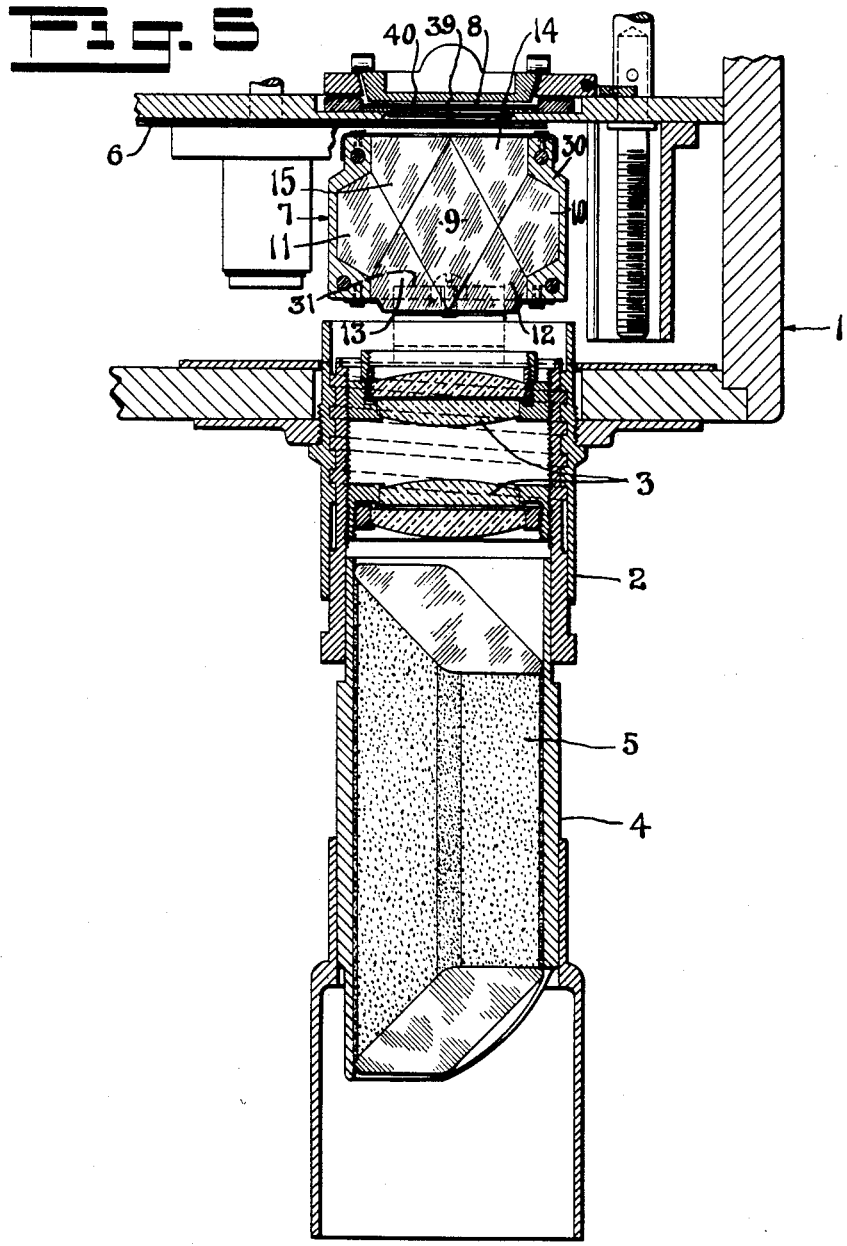
INVENTOR.
Earl M. Welch
BY William Pelzer
ATTORNEY.

April 28, 1942.  E. M. WELCH  2,280,989
PHOTOGRAPHIC CAMERA AND PROJECTOR
Filed June 27, 1940  6 Sheets-Sheet 4

INVENTOR.
Earl M. Welch
BY William Pfger

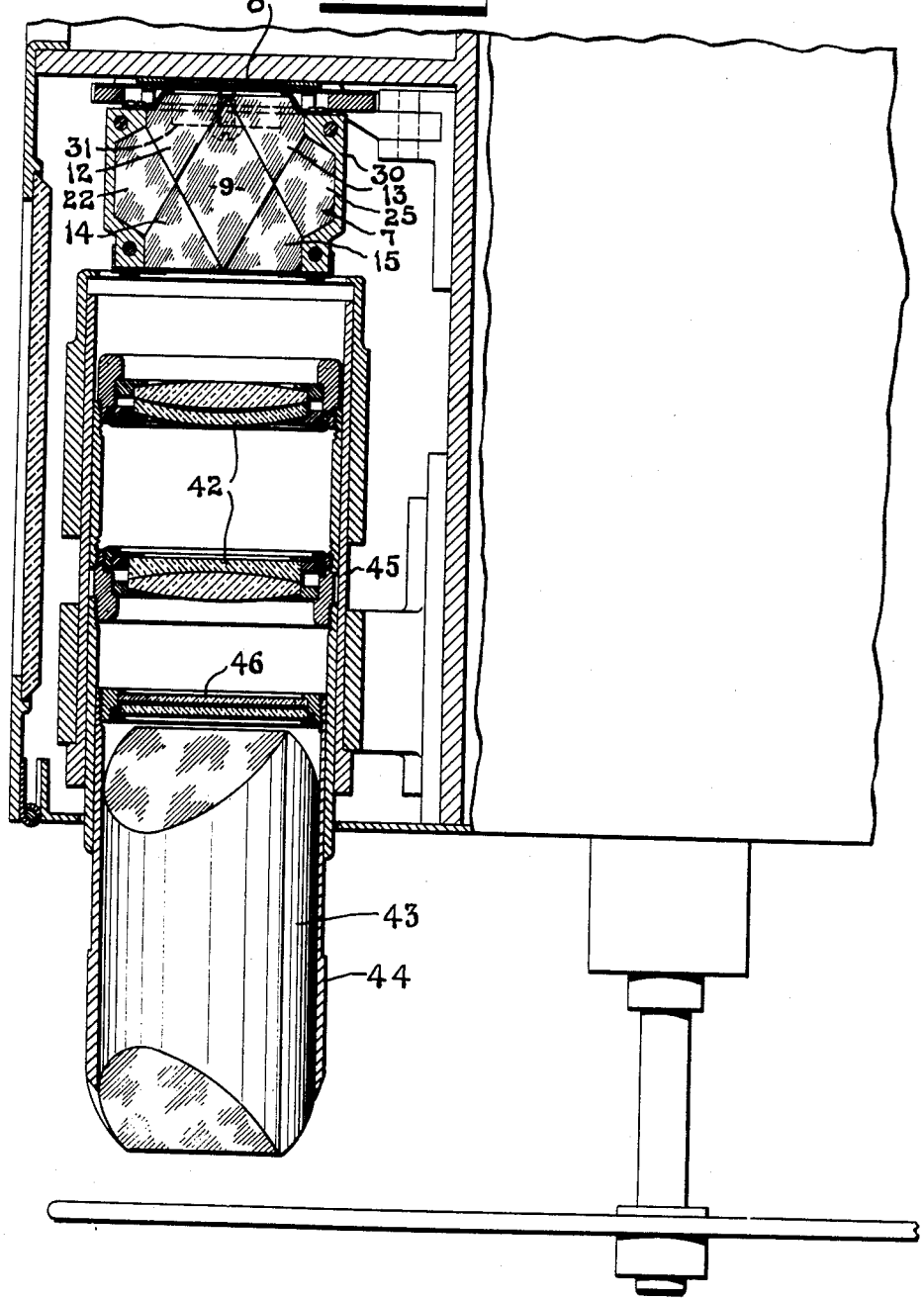

April 28, 1942.   E. M. WELCH   2,280,989
PHOTOGRAPHIC CAMERA AND PROJECTOR
Filed June 27, 1940   6 Sheets-Sheet 6
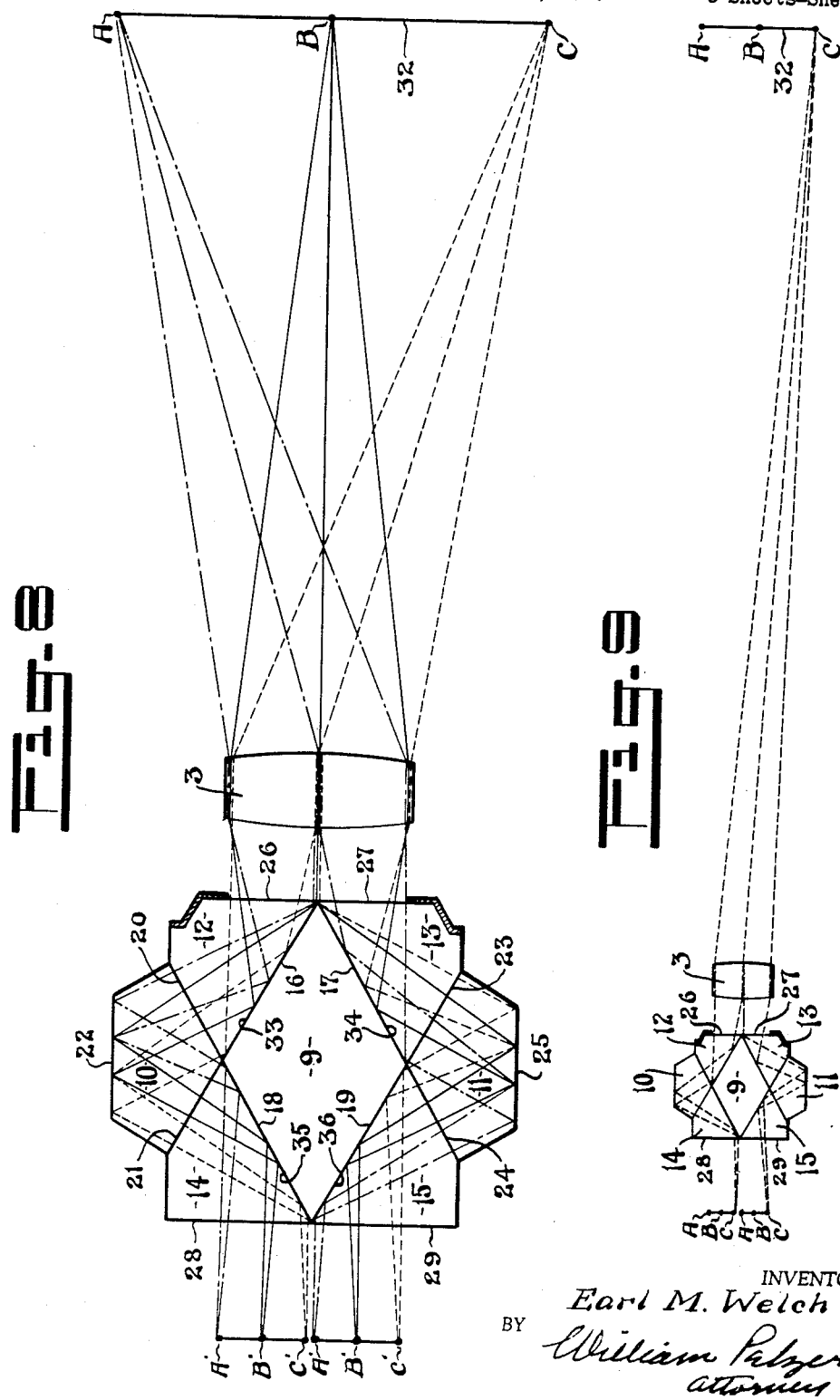
INVENTOR.
Earl M. Welch
BY William Palzer
attorney Patented Apr. 28, 1942

2,280,989

UNITED STATES PATENT OFFICE 2,280,989

PHOTOGRAPHIC CAMERA AND PROJECTOR

Earl M. Welch, Floral Park, N. Y.

Application June 27, 1940, Serial No. 342,619

2 Claims. (Cl. 88—1)

This invention relates primarily to color photography and the projection of pictures in colors onto a screen. Secondly, to motion picture photography and projection in colors, and, thirdly, to optical systems for cameras and projectors for the production and projection of such pictures.

By means of this invention a standard camera can be fitted with a simple attachment without any change whatever in the construction of the camera or of its lenses, which will result in the simultaneous side-by-side production on a standard film of two identical images in black and white, which images can be reproduced as a single image either in black and white, or in natural colors, by means of a standard projector equipped with the same attachment.

The ordinary technique and methods of black and white picture production can be followed throughout, and staining or dyeing of the film before projection is eliminated. In consequence, the present high cost of taking photographs and preparing them for projection in color is reduced to that of black and white pictures.

By this invention substantially all of the light transmitted by the camera lenses is utilized in the production of the two images so that satisfactory negatives can be obtained under much less favorable conditions than are essential for other photographic methods in present use today by which double images are obtained. In these the light from the subject is transmitted directly in part and reflected in part by means of a prismatic system which includes a mirror through which half the light can pass directly to the film to form one image, and by which the other half of the light is reflected so that by a second subsequent reflection it also strikes the film to form the other image. Since, obviously, the projected image must be directly in line with the lens, the other image is offset and the only part of the light transmitted by the lens which is used is that which strikes the prismatic system over an area equal to the area of one image. Therefore, a large percentage of the light transmitted by the lenses is wasted and the exposure must be correspondingly increased to obtain images of satisfactory density.

The image splitting device of this invention is symmetrically positioned with respect to the lens system so that substantially all of the light transmitted by the lenses strikes it and is reflected onto the film. Although this light is divided into two equal parts, each part impinges upon an area of film equal to one half that of an ordinary picture so that the amount of light on each part is substantially the same as it would be for an ordinary picture taken in the ordinary way without the image-splitter of this invention.

Furthermore by this invention there is no possibility of interference between the divided beams which produces the two images.

Not only is the construction of the camera or projector and its lenses entirely unaffected by the addition of this invention, but also no change in any feature of ordinary black and white photography is involved, and the focal length of standard lenses remains practically unchanged.

In projection, the two images are brought into coincidence before passing through the projector lenses so that no defects in superimposing one image upon the other is possible as the result of mismatching or other inconsistencies in the lenses.

The means by which the image is split in photographing and the split images superimposed in projection consists of a solid prismatic unit requiring no adjustment and having no movable parts. Nevertheless, when used in a camera, the size and position of the two images upon the film is maintained automatically regardless of the distance between the subject being photographed and the camera. Likewise, in projection the two images are accurately superimposed without any adjustment whatsoever, regardless of the distance of the screen from the projector, it being assumed, of course, both in photography and projecting that the lenses are correctly focused in the usual way by the usual lens-focusing means. Lens of varying focal lengths can be used without affecting the image-splitting unit, or its position. In short, the unit is simply installed in the camera or the projector and may then be forgotten insofar as subsequent operation is concerned.

By the use of this invention in photographing, films of much more uniform density are obtained regardless of variations in the actinic strength of the light than ordinarily. The reason for this is not fully understood, but it has been proven by many actual experiments that photographs taken throughout the day from early morning until early evening with no change in lens aperture or exposure time or time or temperature of development have densities so nearly the same that they all come so well within the limits of correct exposure and color value, that they may be called "uniform" for all practical purposes. This is of very great practical importance in motion pictures since it eliminates the necessity of varying the light in the printing machine and insures positives of substantially correct density from one end to the other.

Finally, when this invention is used in color projection, there is a partial overlapping of the light beams from the two images after they emerge from the unit, which causes a slight neutralization of each color, thereby producing on the screen an image in pastel shades which are very natural in appearance and observable over long periods with a minimum of eye strain. Also the brilliancy of the image on the screen is increased because of the selective disposition of white light resulting from this neutralization. Increasing the brilliancy of the image on the screen has been a long standing problem in the projection of pictures in colors by the additive process which, before this invention, had not been satisfactorily solved.

One form of the invention which has been selected for description herein is shown in the drawings, in which:

Figure 1 is a side elevation of a motion picture camera provided with the usual lens barrel in which the usual lenses are mounted;

Figure 2 is a front elevation of the same camera;

Figure 3 is a fragmentary view of the front of the camera inside of the front panel on the line 3—3 of Figure 4, viewed as indicated by the arrows;

Figure 4 is a plan view showing a fragment of the camera box in section on the line 4—4 of Figure 2, the lens tube, the image-splitting device, the film and other adjacent parts;

Figure 5 is a similar view showing a fragment of the camera box, film, lenses and lens tube in section, an extension of the lens tube, also in section with a prism mounted therein, by means of which the image is rotated 90 degrees and reversed and the image-splitting unit;

Figure 7 is a plan view in section of a part of the projector, showing the relative arrangement of the film, the unit for reuniting the two images, the lenses, lens tube and lens tube extension in which is mounted the prism for rotating and reversing the image to restore it to its original appearance;

Figure 8 is a view illustrating diagrammatically the paths followed by the light rays from the image to the film in photographing and from the film to the screen in projecting; and Figure 9 is a simplified view of similar character to Figure 8.

Figure 6:
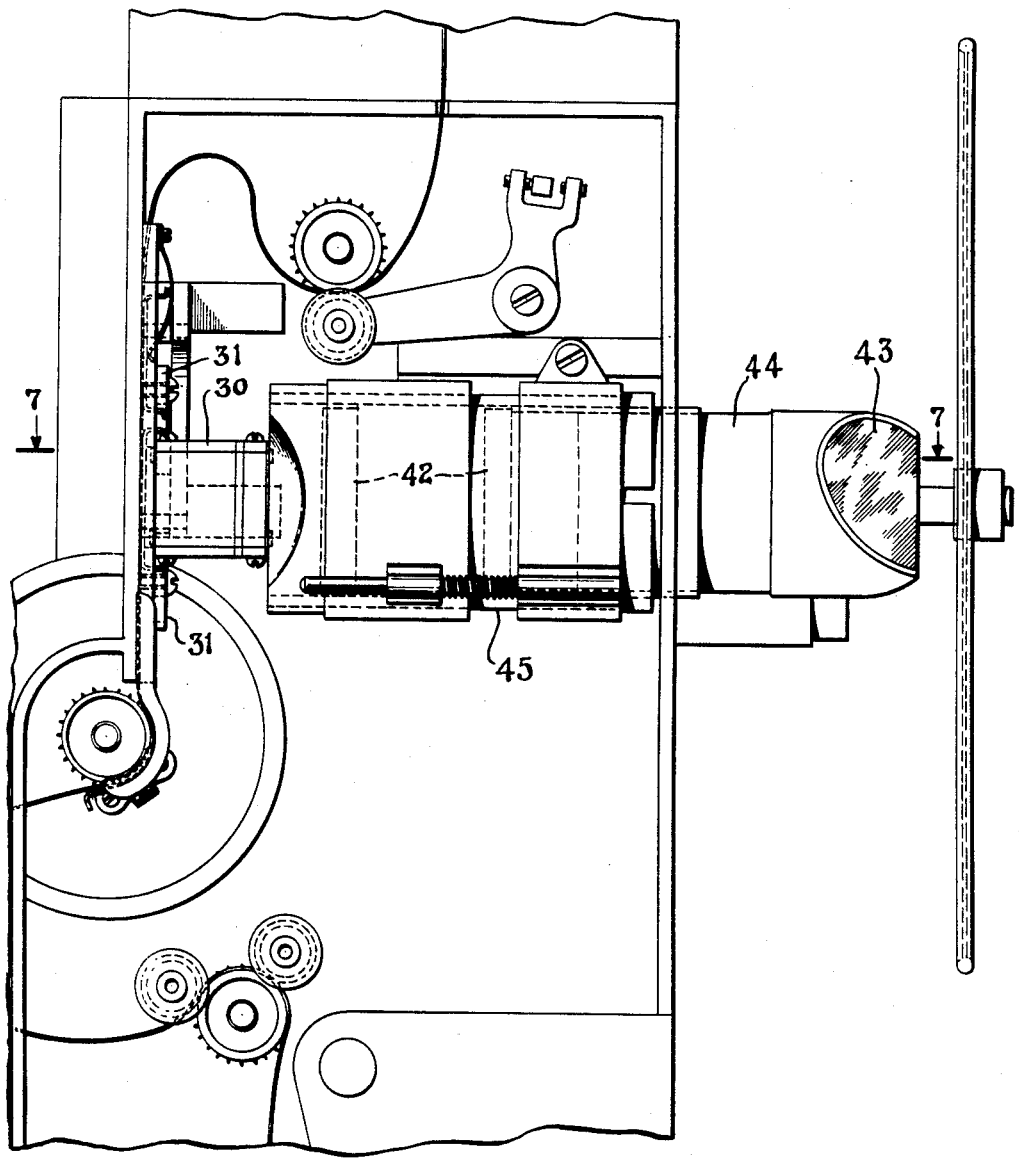
Figure 6 is a side elevation of a projector in which this invention is embodied with the side panel removed.

As shown in Figures 1, 2, 3, 4 and 5, the camera 1 is in all respects a standard motion picture camera. The particular camera shown is to be considered as typical of substantially any present-day camera. The lens tube 2 (Figure 2) may be standard and within it is mounted the usual lens system 3. A lens tube extension 4 is fitted snugly, but rotatably into the front end of lens tube 2 and within it is mounted a prism 5, by means of which the image being photographed and entering the front end of lens tube extension 4 is rotated 90 degrees and reversed in the well-known manner.

Behind the other end of the lens tube 2 and in front of the shutter 6 is the image-splitting unit 7, by means of which the single-image projected through prism 5 and lens system 3 is split into two separate, identical, substantially half-size images side-by-side which are so photographed upon the film 8. Since the original image has been rotated 90 degrees, the two images on the film will be lying on their side, so to speak, with the true bottom of one image adjacent the true top of its companion image.

Unit 7, which splits the image into two images in this way, is best illustrated in Figures 5 and 8. As will be seen, it consists of seven prisms, 9–15. All of these are of exactly the same thickness and have flat and parallel top and bottom surfaces. The prism 9, which is commonly known as a rhom prism, has four accurately cut and polished plane surfaces of equal length. Two of these, 16 and 17, are inclined at an angle of 30 degrees on opposite sides of the longitudinal axis of the prism so that between them there is an angle of 60 degrees. The other two surfaces, 18 and 19, are similarly symmetrically positioned with respect to the longitudinal axis of the prism and also form an angle of 60 degrees. Also, prism 9 should be substantially equal in width to the space on the film available for the photographic image or images.

On either side of prism 9 are positioned pentagonal prisms 10 and 11. Surfaces 20, 21, of prism 10 and surfaces 23, 24 of prism 11 are perfectly flat polished surfaces which, as will be seen, lie in exactly the same planes as the faces of prism 9. Surfaces 22 and 25 of prisms 10 and 11 are exactly parallel to each other, and to the major axis of prism 9, and are spaced from the major axis of prism 9 by substantially one and one-eighth times the width of prism 9, or, to express this in another way, are spaced from the major axis of each pair of prismatic wedges, by a distance substantially equal to two-thirds the distance between said axes. Also, they are flat and highly polished, and are provided with mirror surfaces. The V-shaped spaces between prism 9 and prisms 10 and 11 are accurately filled by the wedge-shaped prisms 12, 13, 14 and 15, the faces of which are also perfectly flat and highly polished so that they make perfect contact with the faces of prisms 9, 10 and 11. Faces 26 and 27 of prisms 12 and 13, and faces 28 and 29 of prisms 14 and 15 are also perfectly flat and highly polished and in addition are exactly parallel to each other and are perpendicular to the major axis of prism 9. Prisms 12 and 13 are identical in all respects as are prisms 14 and 15.

It will be obvious that these seven prisms, when assembled as shown and described, form a perfectly solid prismatic block 6, symmetrical with respect to the major axis of prism 9. It will also be evident that all adjacent surfaces of the prisms will make perfect contact throughout. This prismatic unit can be assembled easily with the greatest accuracy and mounted permanently within a suitable holder 30, so that their arrangement and alinement cannot possibly be disturbed. This holder is rigidly attached to the camera by suitable brackets and bolts 31 so that the unit is rigidly positioned with the major axis of prism 9, in alinement with the space between the two images on the film.

Prism 9 is of no optical importance to the prism unit. It is simply an aligning block by means of which the other prisms can be easily and accurately assembled, and, if desired, may be subsequently removed. However, it is preferable to retain it as part of the unit because it, together with the holder 30, renders displacement of the other prisms substantially impossible.

The dimensions of prism unit 7 are determined primarily by the size of the film aperture. That is to say, surfaces 26 and 27 of prisms 12 and 13 and surfaces 28 and 29 of prisms 14 and 15 should be at least as large, and preferably a little larger than the film aperture and the other surfaces of these prisms and the surfaces of prisms 10 and 11, which partake in the action of the unit, should be of sufficient area to reflect or transmit, as the case may be, all of the light rays which can be utilized in making the images on the film. Within these limits it is advisable to make the unit as small as possible because of space limitations in the camera or projector.

As is well known, light rays from any point of the subject being photographed impinge upon and uniformly cover the front face of the lens system of the camera, and then pass through the lens system and by it are focused to a point upon the film.

In this invention, however, the image-splitting unit 7 is interposed between the lens system 3 and film 8 so that part of the light rays from a point A (Figure 8) of the subject 32 after passing through lens system 3 pass through face 26 of prism 12, and the rest through face 27 of prism 13 and are reflected, respectively, from the inside of surface 33 of prism 12, and the inside of surface 34 of prism 13 onto surfaces 22 and 25, respectively, of prisms 10 and 11. These surfaces 22 and 25 are coated with an opaque mirror as highly reflective as possible, and from them the rays are again reflected upon the inside of surfaces 35 and 36 of prisms 14 and 15, respectively, and from these surfaces are reflected again through faces 28 and 29 onto film 8. The light rays from other points, such as B and C, of the subject 32 follow similar paths. All of the rays enter into and emerge from the several prisms at substantially right angles to their surfaces so that none of them are dissipated or deflected by reflection at these surfaces. In consequence, all of the light which strikes the prism initially is utilized in making the images on the film with the exception of the minute amount absorbed by the glass.

As will be seen from Figure 8, there will be formed in this manner on the film 8, two half size images, each identical with the subject 32 and one beside the other. All of the light rays from subject 32, which strike the lenses 3, follow paths of exactly the same length so that they can all be brought to sharp focus upon the film by means of the ordinary focusing adjustment of the lenses. Although only one-half of the light transmitted by the lenses 3 is utilized to produce each image, each image is only half the usual size so that the intensity of the light upon each half of the film is not diminished and no increase in exposure time is required.

It will be noted that the path of each light ray between the lens system and the film through image-splitting unit 7 is much longer than the normal focal length of the lens system. Therefore, it might be thought that it would be necessary to bring the lenses and the film much closer together than usual in order to focus the images upon the film, and, consequently, that the image-splitting unit 7 might interfere. This is obviated by taking advantage in prisms 10—15 of the well-known phenomenon that a light ray passing through a given thickness of glass is lengthened a given amount. By making prisms 10—15 of suitable thickness, in accordance with established optical knowledge, the focal length of the lens system is, in effect, lengthened so that the light rays are focused sharply upon the film 8 at the normal, or substantially normal, lens position, and image-splitting unit 7 will not interfere with the small adjustment of the lens system 3 which may be necessary for sharp focusing.

Since none of the light rays entering one side of image-splitting unit 7 can pass through the reflecting surfaces of prisms 12, 13, 14 and 15, the rays forming the two respective images cannot possibly overlap when they emerge from prisms 14 and 15. However, since space of approximately one-half an inch must be between the image-splitting unit 7 and the film to accommodate the shutter, there is a slight tendency for the rays to spread while traversing this space, with the result that those forming the top of one image might overlap those forming the bottom of the other image. To prevent this it is advisable to insert directly in front of the film a narrow, opaque barrier 39, which will prevent any light rays from striking the area on the film between the two images. In projection no opaque barrier is used, the unit itself providing all segregation of light beams.

For color photography a filter 40 (Fig. 5), one-half of which is orange-red, and the other half blue-green, is inserted as shown in Figure 5 between the shutter 7 and the film 8. The dividing line between the two sections of this filter coincides, of course, with the axis of the image-splitting unit, so that the rays which form the respective images on the film pass through different halves of the filter. If desired, barrier 39 may be combined with filter 40 to separate the two halves of the filter as shown.

From Figure 8 it will be noted that rays of light from the subject 32, which impinge obliquely upon the lens 3 such as those from point A, are also projected obliquely by the lens, so that more rays, or a greater quantity of light, will pass through one side of image-splitting unit 7 than the other; therefore, the area of one image on the film 8 adjacent the point A' might be somewhat denser than the equivalent point A' on the other image on the film. To substantially equalize the illumination of the film by the light from such more or less oblique points of subject 32, it is advisable to interpose between the lens and image-splitting unit 7 a mask 41 which will cut out a certain number of the rays which pass through the lens and into the image-splitting unit 7 on the side of the optical axis of the lens system opposite to that of point A. Although this reduces slightly the volume of light which reaches the film, this reduction is not serious and a substantially identical density for the corresponding parts of the two images is assured. Also, when projecting in color, all risk of red or green discolorations in the sky area of one image and the foreground area of the other is eliminated.

A mask 41 of this sort suitable for substantially equalizing the rays from one oblique point such as A in Figure 8, will automatically equalize the rays from a point C positioned at the same obliquity on the other side of the optical system, and also any other oblique rays between these extreme points of the subject and the center point B directly in line with the optical axis of the system 3.

To project a film of the character described onto a screen all that is required is a standard projector such as that diagrammatically illustrated by Figure 6, equipped with a standard projection lens system 42, shown in Figure 7, to which has been added the image-splitting unit 7, or an exact duplicate thereof, which now serves as a means for reconverting the two images into a single image of the subject 32. The superposition of the two images on film 8 occurs between the surfaces 26 and 27 of unit 7 and the rear surface of lens system 42, so that no errors in the superposition of the images can occur from peculiarities in any part of the lens system.

The manner in which unit 7 converts the two images on the film into a superposed image, as above described, will be understood from Figure 8, simply by tracing the light in a reverse direction or from film 8 to subject 32 which for this purpose can be considered as the screen.

Since the images on film 8 were photographed in a position rotated 90 degrees from normal, and also reversed, the projector should also be provided, of course, with a prism 43 mounted in a tube 44 rotatably fitted into the outer end of lens tube 46, whereby the projected image is again rotated and reversed to restore it to its normal upright position corresponding to that of the subject photographed.

To reproduce in color the subject photographed in black and white through filter 40, all that is required is a set of orange-red and blue-green filters 46 interposed in the path of light rays from the images on film 8 so that the image photographed through the orange-red filter of the camera will be projected through the orange-red filter of the projector, and the image photographed through the blue-green filter of the camera will be projected through the similarly-colored filter of the projector.

By this apparatus it will be noted that photographs can be projected in either black and white or in natural color from a black and white film by omitting or using suitable filters. Therefore, all the difficult, troublesome and costly operations of dyeing the film and of determining the correct colors with which to dye them, which are employed in commercial motion pictures in color at the present time, are avoided. Furthermore, pictures in color photographed and projected with the assistance of this invention, appear to the eye softer and more natural than those from dyed films, even though in the latter the natural colors have been reproduced with the greatest of spectroscopic accuracy.

The pleasing, soft character of the colors produced on the screen by means of this invention are accounted for by the fact that in projection there is a slight intermingling and blending of the rays from the orange-red and blue-green halves of the image, so that the vividness of the various resulting colors is slightly neutralized and made softer.

Motion pictures made and projected with the aid of this invention, because of their softness of color and the accuracy with which the images are superimposed, can be observed without noticeable eye strain over much longer periods than can present-day commercial pictures.

The photographic methods involved with the use of this invention are simply those of ordinary black and white photography and the only extra expense is the initial cost of the prisms composing unit 7 and its installation in the camera or projector.

I claim:

1. An optical unit adapted for a camera or projector provided with a conventional objective, which consists of a prism unit adapted to be positioned in the camera or projector symmetrically with respect to the optical axis of the objective, said prism unit when used in a camera including means for receiving substantially all of the light rays passing through the objective of the camera, splitting them into two substantially equal halves and directing these halves side-by-side upon a light sensitive surface to form two identical images of the object at which the rays originate and when used in a projector for receiving substantially all of the light projected through two such images and combining these rays to form a single image, said prism unit consisting of four essentially equi-angular triangular prismatic wedges arranged in pairs apex to apex and with the bases of each pair contiguous and in alignment and parallel to the bases of the other pair, two additional prisms, each filling one of the V-shaped depressions formed by the outer sides of each pair of prismatic wedges, each of said additional prisms having a reflecting surface parallel to the major axis of each pair of prismatic wedges and spaced from said axis a distance substantially equal to two-thirds the distance between both of said axes.

2. An optical unit adapted for a camera or projector provided with a conventional objective, which consists of a prism unit adapted to be positioned in the camera or projector symmetrically with respect to the optical axis of the objective, said prism unit when used in a camera including means for receiving substantially all of the light rays passing through the objective of the camera, splitting them into two substantially equal halves and directing these halves side-by-side upon a light sensitive surface to form two identical images of the object at which the rays originate and when used in a projector for receiving substantially all of the light projected through two such images and combining these rays to form a single image, said prism unit consisting of four essentially equilateral triangular prismatic wedges arranged in pairs apex to apex and with the bases of each pair contiguous and in alignment and parallel to the bases of the other pair, two additional prisms, each filling one of the V-shaped depressions formed by the outer sides of each pair of prismatic wedges, each of said additional prisms having a reflecting surface parallel to the major axis of each pair of prismatic wedges and spaced from said axis a distance substantially equal to two-thirds the distance between both of said axes the distance between said axes being substantially equal to the over-all width of the space to be occupied by said two images on said light sensitive surface.

EARL M. WELCH.